(12) United States Patent
Porter et al.

(10) Patent No.: US 6,923,249 B1
(45) Date of Patent: Aug. 2, 2005

(54) PASSIVE THERMAL CONTROL SYSTEM

(75) Inventors: Harry H. Porter, Parker, CO (US); Jose Valenzuela, Highlands Ranch, CO (US); James D. Williams, Evergreen, CO (US); Timothy W. Harvey, Colorado Springs, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/447,971

(22) Filed: May 28, 2003

Related U.S. Application Data (60) Provisional application No. 60/470,644, filed on May 15, 2003.

(51) Int. Cl.[7] .................................. B64G 1/44
(52) U.S. Cl. .................. 165/104.14; 165/48.2; 244/173; 136/246
(58) Field of Search ............... 165/41, 104.14, 165/42, 47, 48.1, 48.2; 244/173, 163, 158 A; 136/244, 246, 293; 343/700 MS (56) References Cited

U.S. PATENT DOCUMENTS

| | | | |
|---|---|---|---|
| 3,594,803 A | | 7/1971 | Pucillo .................... 343/720 |
| 4,563,725 A | * | 1/1986 | Kirby ...................... 361/708 |
| 4,854,526 A | * | 8/1989 | Rochefort ............. 244/158 R |
| 4,864,317 A | | 9/1989 | Sorko-Ram ............... 343/720 |
| 5,087,920 A | * | 2/1992 | Tsurumaru et al. .. 343/700 MS |
| 5,148,860 A | * | 9/1992 | Bettini ...................... 165/41 |
| 5,310,141 A | * | 5/1994 | Homer et al. ......... 244/158 R |
| 5,608,414 A | * | 3/1997 | Amore ............... 343/700 MS |
| 5,644,207 A | | 7/1997 | Lew et al. .................. 320/5 |
| 5,665,274 A | | 9/1997 | Long et al. ................ 252/511 |
| 5,870,063 A | * | 2/1999 | Cherrette et al. .......... 343/853 |
| 5,927,654 A | * | 7/1999 | Foley et al. ............... 244/173 |
| 5,957,409 A | | 9/1999 | Castiel et al. ......... 244/158 R |
| 6,043,629 A | | 3/2000 | Ashley et al. ............. 320/119 |
| 6,064,180 A | | 5/2000 | Sullivan et al. ........... 320/132 |

(Continued)

FOREIGN PATENT DOCUMENTS

| | | | | |
|---|---|---|---|---|
| JP | 411-041830 A | 2/1999 | ............ | H02J 7/34 |
| JP | 411-171100 A | 6/1999 | ............ | B64G 1/58 |

OTHER PUBLICATIONS

Timothy Wayne Harvey, "The Use of Neural Networks in a Smart Battery Charger," Thesis from the University of Missouri-Rolla, 1995.

*Primary Examiner*—Tho v Duong
(74) *Attorney, Agent, or Firm*—Marsh Fischmann & Breyfogle LLP (57) ABSTRACT

A passive thermal control system maintains the operating temperature range of protected equipment within desired limits by controlling the conductive attributes of thermal interfaces and physical relationships within the system so as to achieve a desired thermal balance. In one embodiment, an integrated cell unit (100) includes a solar array (102), a Lithium ion cell (108) and an antenna assembly (114) such as a phased array antenna. In operation, a thermal gradient (116) is defined between the array (102) and the assembly (114) as the assembly (114) radiates heat from the array (102) into space. The operating temperature range of the cell (108) is controlled by appropriate design of the thermal interfaces between the cell (108) and the assembly (114) and/or interfaces within the assembly (114), such as a thermal interface associated with dielectric spacers provided between emitter pairs of the assembly (114).

18 Claims, 8 Drawing Sheets

U.S. PATENT DOCUMENTS

| | | |
|---|---|---|
| 6,064,859 A | 5/2000 | Leopold et al. ............ 455/13.1 |
| 6,184,656 B1 | 2/2001 | Karunasiri et al. ......... 320/119 |
| 6,260,804 B1 | 7/2001 | Anderson et al. ....... 244/158 R |
| 6,369,545 B1 | 4/2002 | Williams et al. ............ 320/101 |
| 6,394,395 B1 | 5/2002 | Poturalski et al. .......... 244/173 |

* cited by examiner

PASSIVE THERMAL CONTROL SYSTEM

This application is a provisional of application Ser. No. 60/470,644 filed May 15, 2003.

FIELD OF THE INVENTION

The present invention relates generally to thermal control systems that use thermal radiators to control the operating temperature range of associated equipment. More specifically, the present invention relates to controlling the conductive attributes of thermal interfaces and physical relationships of such systems so as to achieve the desired thermal balance via passive thermal control. The invention is particularly apt for thermal control of components within an integrated solar array/antenna systems for space-based platforms.

BACKGROUND OF THE INVENTION

Passive thermal control is desired in a variety of settings where thermal dissipaters are associated with equipment having a narrow temperature range in which to function. In this context, passive thermal control systems include systems that substantially automatically dissipate heat through conduction, convection and/or radiation without the active involvement of complicated temperature feedback control components or other potentially costly, complex, massive or less reliable mechanisms.

The case of thermal management of systems for spacecraft including satellites is illustrative. Such systems may include large, typically planar solar arrays, batteries, sensitive instruments, large, typically planar antennae and associated electronics. Many of these components require a narrow range of operating temperatures for optimal performance. Preferably, such systems employ passive thermal control, involving radiating heat into cold space, to maintain thermal stability such that active control systems, with attendant complexity, added mass and potential for malfunction, are not required.

In this regard, it is typically desired to maintain antenna electronics in a temperature range of between about +40° C. and −40° C. Some other components that spacecraft designers would like to use, if they could be accommodated, optimally require an even narrower temperature range. For example, spacecraft designers have recognized that Lithium-based batteries (e.g., Lithium ion, Lithylene, etc.) provide a number of potential advantages for spacecraft applications because they offer lighter, more efficient assemblies. However, such batteries require a narrow operating temperature range for optimal performance, for example, an operating range between about +30° C. and −15° C. Such batteries typically also require limited depth of discharge and careful charge control to more fully realize their potential benefits for spacecraft applications.

In the spacecraft environment, a number of obstacles complicate passive thermal control. First, there are typically tremendous and greatly varying thermal dissipation requirements. The magnitude of such heat dissipation may be the result of, for example, the operation of many components in a small volume and high solar fluxes on radiation attenuating surfaces. Substantial variability and heat dissipation requirements may be the result of varying operating modes of instruments (and attendant variations in RF and DC power consumption) based on mission objectives, varying solar energy fluxes as a function of orbital phase, and varying beta angles (the angle of the solar vector to the orbital plane) as between different missions. Accordingly, one challenge that faces designers in such contexts is providing temperature control to within a narrow range in a challenging thermal environment using passive thermal control. Another challenge relates to providing thermal control and other control necessary to realize the potential advantages of preferred components such as Lithium-based batteries. Some of the many other challenges include meeting mission requirements for size and mass, simplifying control systems, improving manufacturability, and enabling orbital and other operating parameters that have previously been unattainable or impractical due to limitations related to thermal control, energy storage, charge control, power distribution and other systems.

SUMMARY OF THE INVENTION

The present invention is directed to passive thermal control systems, and associated methodology, capable of providing temperature control, for temperature sensitive components, to within a narrow range in challenging thermal control environments such as spacecraft systems. The invention thus enables optimized use of temperature sensitive components such as Lithium-based batteries in such environments which, in turn, enables the design and construction of optimized integrated cell units including one or more powered components together with thermally integrated power generation and energy storage systems. That is, the powered components, power generation and energy storage systems are integrated into a common passive thermal control environment to allow for a distributed power system so as to reduce mass and complexity in relation to certain centralized power distribution designs.

In accordance with one aspect of the present invention, a passive thermal control system and associated methodology is provided for maintaining a controlled component within a desired operating temperature range. The controlled component may be any component for which temperature control is desired such as, for example, in the spacecraft environment, a Lithium-based battery or antenna electronics. More than one such controlled component may be temperature controlled by the passive thermal control system. The control system includes a thermal generator and a thermal dissipater disposed in thermal communication so as to define a thermal gradient therebetween, and structure for controlling the relative configuration of the controlled component and the thermal gradient so as to provide a desired thermal control. For example, the spatial distribution of the thermal gradient and/or the disposition of the controlled component within the gradient may be controlled in this regard.

In one application, heat transfer parameters of a thermal interface are controlled in an integrated antenna and solar array unit. The unit includes a solar array having a photovoltaic external surface for receiving solar radiation. It will be appreciated that in addition to generating electrical power the solar array assembly also generates heat in a power magnitude dependent on solar intensity, incidence angle, and other factors. The unit further includes an antenna assembly having an RF radiator array external surface. The antenna is generally operative for transmitting and receiving signals, such as RF signals, in fulfillment of mission objectives. In the context of the present invention, the antenna external surface is operative for radiating thermal energy therefrom. It will be appreciated that large faces exposed to cold space and thermally conductive materials typically associated with antenna assemblies provide a potentially efficient heat dissipation mechanism in this regard. The solar array assembly is in thermal contact with the antenna assembly primarily via radiation with minimum conduction so that thermal energy passes from the solar array assembly to the antenna external surface so as to define a thermal gradient.

Distribution may be controlled by appropriate design of the materials and/or geometry of a thermal interface of the unit to control the heat transfer properties thereof, and hence control the spatial distribution of the thermal gradient. In this regard, a partial insulating layer formed from heat insulating material may be interposed between the array external surface and the antenna external surface. The partial insulating layer extends across a first portion of a heat exchange interface area between the external surfaces and is absent from a second portion of the interface so as to permit heat transfer across the second portion free from thermal impedance due to conduction through the heat insulating material. For example, the partial insulating-layer may be provided between the controlled component and the antenna external surface. The relative size and the configuration of the first and second portions of the partial insulating layer may be selected to provide desired heat transfer capabilities. Moreover, the first portion of the heat exchange interface covered by the partial insulating layer may be one continuous area or a number of discrete areas.

In one embodiment, the partial insulating layer is integrated into an antenna design. For example, the antenna assembly may be a phased array antenna having a classical stacked patch configuration in which two radiating elements are separated by a low dielectric material in order to broaden the bandwidth of the antenna. The separation medium may be, for example, Rohacell foam and provides a carefully controlled element spacing. Conventionally, one of the antenna elements may be fabricated on a dielectric layer and the other attached to a continuous Rohacell foam layer. The antenna is then assembled so that a continuous foam layer extends between the sets of antenna elements across the full extent of the interface between the solar array and the antenna radiator. In accordance with the present invention, such a low dielectric material may be selected to be a material that also has appropriate heat insulating properties. This material may then be made, for example, substantially coextensive with the opposing elements or larger than the opposing elements but having a coverage area that extends across less than the full heat exchange interface at that assembly location. The specific configuration and size of the partial heat insulating layer may be selected based on mission requirements.

Alternatively or additionally, a thermal interface may be controlled at the location of the controlled component. For example, as noted above, the controlled component may comprise a Lithium-based battery disposed within the thermal gradient. In this regard, the controlled component may include thermal standoffs located on the high energy and/or low energy side of the controlled component relative to the thermal gradient to control heating of or heat dissipation from the controlled component. Thus, for example, the controlled component may be interfaced with the antenna radiator via a number of legs formed from material having a desired cross-sectional dimension, a desired length and desired heat transfer properties so as to appropriately control heat transfer as between the controlled component and the antenna radiator. It will be appreciated that other possibilities exist for controlling heat transfer interfaces between the external array surface and the external antenna surface, either up the thermal gradient from the controlled component or down the thermal gradient, or both.

Additionally or alternatively, the relative configuration of the thermal gradient and the controlled component may be controlled by appropriate selection of the position of the controlled component within the thermal gradient. Thus, for example, the controlled component may be disposed between the array external surface and the antenna assembly. In this regard, the thermal gradient in this region may define a corresponding temperature gradient for given operating conditions such that the operating temperature of the controlled component depends at least in part on its location along the axis of the thermal gradient. The operating temperature range of the controlled component can be controlled by selecting a location of the controlled component along this axis. For example, the controlled component may be interfaced with the antenna assembly via one or more support legs. The length of these legs may be selected to position the controlled component at the desired location within the thermal/temperature gradient.

An associated process for use in constructing an integrated antenna and solar array units involves: determining operating parameters for the unit related to generation of heat associated with the solar array unit; determining a desired operating temperature range of the controlled component, and using the operating parameters and the desired operating temperature range to control the relative configuration of a controlled component and a thermal gradient. The operating parameters may relate to the orbital parameters of the spacecraft, the solar incidence angles of the solar arrays (which may vary during a mission), the thermal characteristics of the solar array, antenna radiator and other elements, and the operating modes of thermally associated instruments. The operating temperature range will typically be determined based on the characteristics of the controlled component and mission requirement such as the required life cycle of the controlled component. The operating parameters and their operating temperature range can be used, for example, in calculations to determine the size and shape of a partial insulating layer, the length, cross-sectional area and thermal properties of standoffs associated with the controlled component, or the positioning of the controlled component relative to the thermal gradient axis.

In accordance with another aspect of the present invention, an integrated cell unit is provided. As noted above, the ability to adequately control operating temperature ranges using passive elements facilitates the deployment of integrated cell units that include a powered component together with a power generation system and a heat dissipation system. In this regard, an integrated antenna and solar array in accordance with this aspect of the invention includes: a solar array assembly having an external surface for receiving solar radiation; an antenna assembly having an external surface operative to radiate thermal energy therefrom, where the antenna external surface faces substantially opposite the array external surface. The solar array assembly is in thermal contact with the antenna assembly primarily via radiation with minimum conduction so that thermal energy passes from the solar array assembly to the antenna external surface thereby defining a thermal gradient. The unit further includes a battery, operatively associated with the solar array assembly and the antenna assembly, disposed in the thermal gradient where the positioning of the battery within the gradient assists in maintaining the battery within a desired operating temperature range for the battery. This construction enables the battery to be maintained within a carefully controlled temperature range thereby facilitating deployment of Lithium-based batteries. Moreover, the battery may be associated with a charge control system for carefully controlling charging of the battery so as to stay within desired charge levels. This charge control system may include a neural network as described below. Such an integrated cell unit provides a basic module for building distributed power systems and improves manufacturability in this regard.

BRIEF DESCRIPTION OF THE DRAWINGS

For a more complete understanding of the present invention and further advantages thereof, reference is now made to the following Detailed Description taken in conjunction with the drawings in which.

DETAILED DESCRIPTION

The present invention is directed to a passive thermal control unit and associated systems and methodology relating to thermal dissipaters associated with equipment requiring a narrow temperature range in which to function. In the following description, the invention is set forth in the context of an integrated cell unit for spacecraft applications. It will be appreciated that the invention has particular advantages in such contexts as it enables simple, reliable, lightweight and passive operation in a space environment. However, it will be appreciated that various aspects of the present invention are more broadly applicable to other passive thermal control applications.

Figure 1:
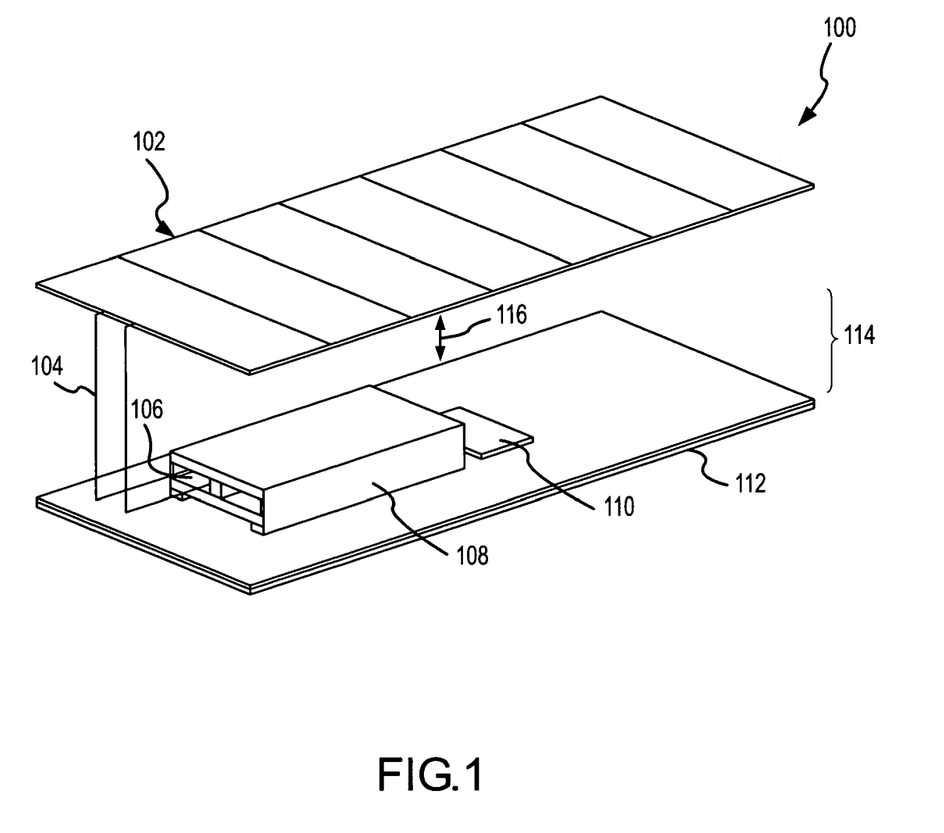
FIG. 1 is a perspective view of an integrated cell unit in accordance with the present invention.

Referring to FIG. 1, an integrated cell unit 100 in accordance with the present invention is shown. The integrated cell unit 100 can be used to implement the concept of distributed power for phased array antennas including ultra-large phased array antennas, e.g., having areas on the order of about hundreds to thousands of square feet. Such phased array antennas require enormous power to function. Conventional power systems for such phased array antennas collect energy through solar panels that is sent to a central voltage regulator and power conditioner from which large capacity batteries are charged. The batteries supply power to the antenna units through a power distribution unit. There are significant losses inherent in the cumulative inefficiencies associated with such a power distribution system. Additionally, such systems are poorly suited to charging preferred battery systems such as Lithium ion batteries.

In order to improve power distribution in connection with phased array antennas, the concept of distributed power becomes attractive. This distributed power concept integrates a string of solar cells with an autonomously controlled Lithium ion cell which supplies power to an RF (radio frequency) TR (transmit/receive) module that controls a set of radiating elements. Specifically, a charge controller implements logic such as neural network logic for maintaining the desired control of the battery so as to avoid, for example, undesired depth of charge conditions. This concept is described in detail in U.S. Pat. No. 6,369,545 entitled "Neural Network Controlled Power Distribution Element" by Williams et al. which is incorporated herein by reference in its entirety.

The unit 100 of FIG. 1 implements the concept of distributed power while employing passive thermal control as described below that enables the operating temperature range of particular components to be controlled to within carefully set temperature limits. In this regard, the unit 100 allows for use of Lithium based batteries in connection with such distributed power systems so as to realize the potential benefits, as noted above, of these batteries in such applications. Specifically, the unit 100 of FIG. 1 includes a large area substantially planar solar array 102, a Lithium ion cell 108, a transmit/receive module 110 and an antenna element 112. Any suitable solar array technology may be used in this regard and it is anticipated that the array chemistry, size and configuration will be determined based on mission requirements. Moreover, in certain cases, the solar array may be actively configurable to meet varying needs over the course of the mission. The array 102 is interfaced with the Lithium ion cell 108 so as to charge the cell 108 based on energy generated by the array 102. As noted above and described in more detail in the above noted U.S. Pat. No. 6,369,545, careful control of charging is required in connection with the use of Lithium ion batteries in order to optimize performance. In this regard, the illustrated unit 100 employs a charge controller 106 for executing neural network logic as described in the above-noted patent for controlling such charging of the Lithium ion cell 108. Leads 104 provide the associated electrical connection between the array 102 and the controller 106/cell 108.

The transmit/receive module 110, and antenna element 112 define a phased array antenna assembly. As will be described in more detail below, the illustrated antenna assembly 114 is formed in a stacked patch configuration in which pairs of radiating elements are separated by a low dielectric material in order to broaden the bandwidth of the antenna. The outermost set of these cells, disposed on the external surface of the antenna assembly 114 facing opposite the external surface of the solar array 102, have a primary function of RF emission. In accordance with the present invention, as described in more detail below, these emitters and the associated radome further function to radiate heat from the solar cells. In this regard, the external surface of the solar array 102 and the external surface of the antenna assembly 114 are preferably disposed in a substantially parallel relationship facing in opposite directions. A temperature gradient, as generally identified by arrow 116, is thereby defined which is substantially normal to the exterior surfaces (as shown, heat may flow in either direction depending, for example, on spacecraft attitude). As described below, the spatial distribution of this temperature gradient and the positioning of the cell 108 in relation thereto can be controlled to tune the thermal properties of the unit for a particular application so as to maintain the cell 108 within a desired operating temperature range.

Figure 2:
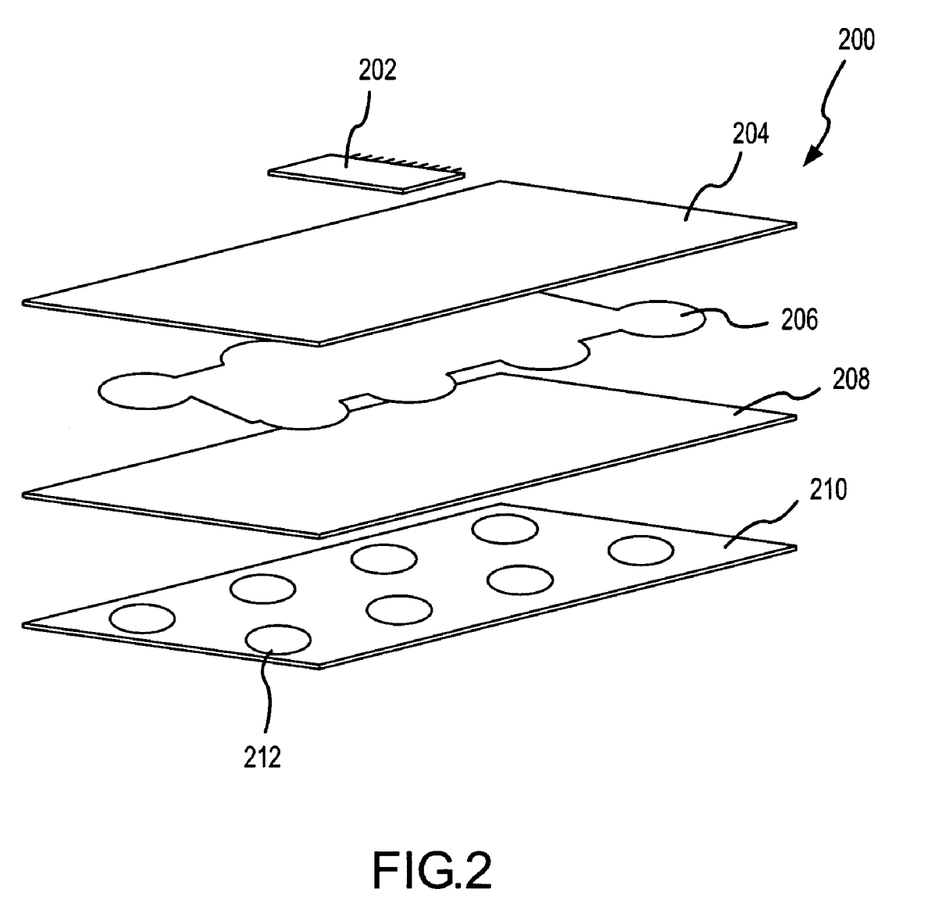
FIG. 2 is an exploded perspective view of an antenna assembly that may be used in the integrated cell unit of FIG. 1.

FIG. 2 illustrates one embodiment of an antenna assembly 200 that may be used in the integrated cell unit of FIG. 1. As will be discussed in more detail below, this assembly 200 may not provide sufficient temperature regulation for the Lithium ion cell and the thermal characteristics of the assembly 200 may be modified as described in further embodiments below. The illustrated assembly 200 is a conventional stacked patch antenna system. The assembly 200 generally includes a transmit/receive module 202, a metalized ground plane 204, a first set of patch emitters fabricated on a dielectric layer 206, a dielectric spacer layer 208, and patch emitters 212 formed on a radome sheet 210. The shape of the emitters 212 may vary, for example, to be round or square. The spacer layer 208 is formed from a low dielectric material and provides a carefully controlled spacing between the elements of layer 206 and the elements of layer 210 in order to provide the desired bandwidth for the application involved. This layer 208 may be formed from Rohacell foam which is a good thermal insulator. The elements of layer 206 are typically formed on a dielectric layer, such as Duroid, and the associated patch emitters are typically attached to the spacer layer 208 and the resulting laminar structure is then assembled.

Figure 3A:
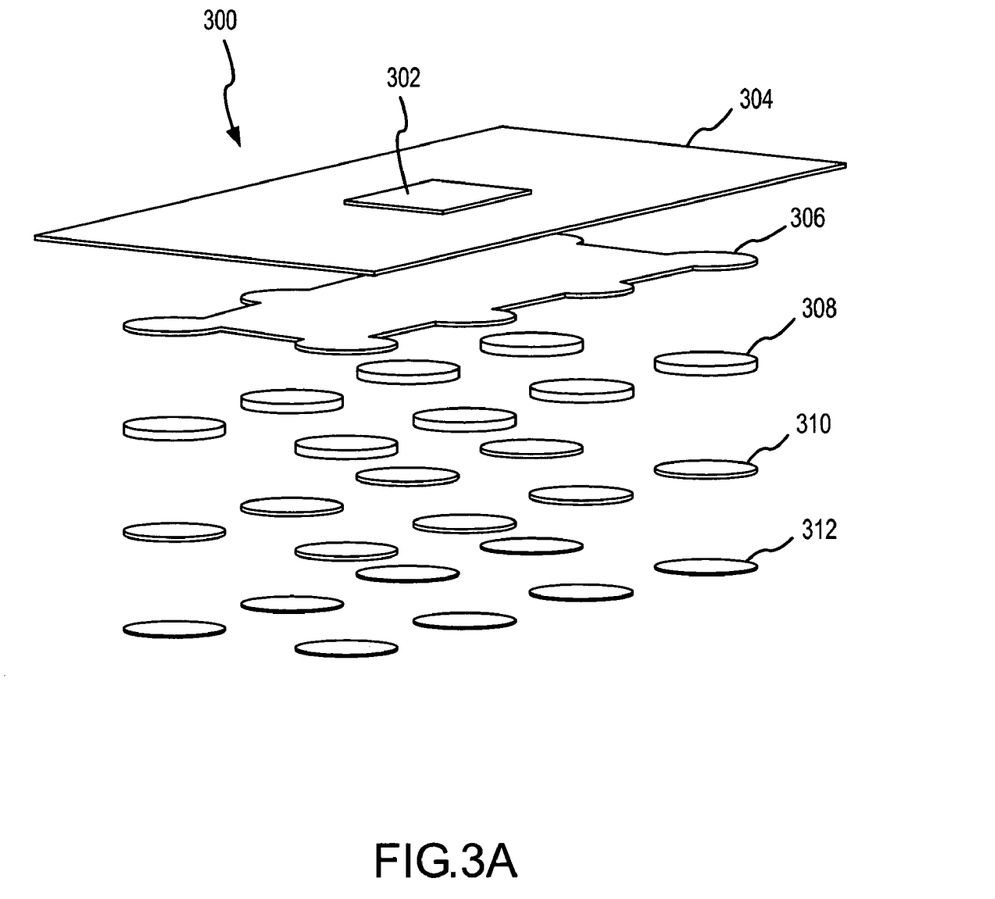
FIG. 3A is an exploded perspective view of an alternative antenna assembly that may be used in the integrated cell unit of FIG. 1.

FIG. 3A shows an alternative embodiment of a radar assembly 300 that may be employed in the unit 100 of FIG. 1. The assembly 300 includes a transmit/receive module 302, a metalized ground plane 304, RF patch emitters formed on a dielectric layer 306, dielectric foam spacers 308 and patch emitters 310 formed on discs of metalized Tedlar 312. The illustrated assembly 300 is distinguished from that of FIG. 2 in that the spacers 308 form a partial insulating layer between the ground plane 304 and the Tedlar disc 312. That is, the spacers 308 cover a portion of the interface between layers 304 and 312 and leave another portion of the interface exposed.

The assembly of FIG. 300 allows for improved heat transfer from the solar array to the antenna radiator. In particular, as noted above, the dielectric material of the spacer material, typically Rohacell foam, has significant heat insulating properties. This provides substantial impedance to heat transfer across the assembly. In the embodiment of FIG. 3, the spacers 308 have a limited physical footprint. Accordingly, substantial heat transfer occurs between the ground plane 304 and the external surface of the assembly 300 via the portions of the interface which are not covered by the spacer elements 308. This provides one element of control over the thermal gradient between the solar array and the antenna radiator that can be designed so that the integrated cell unit has desired heat discharge properties.

Figure 3B:
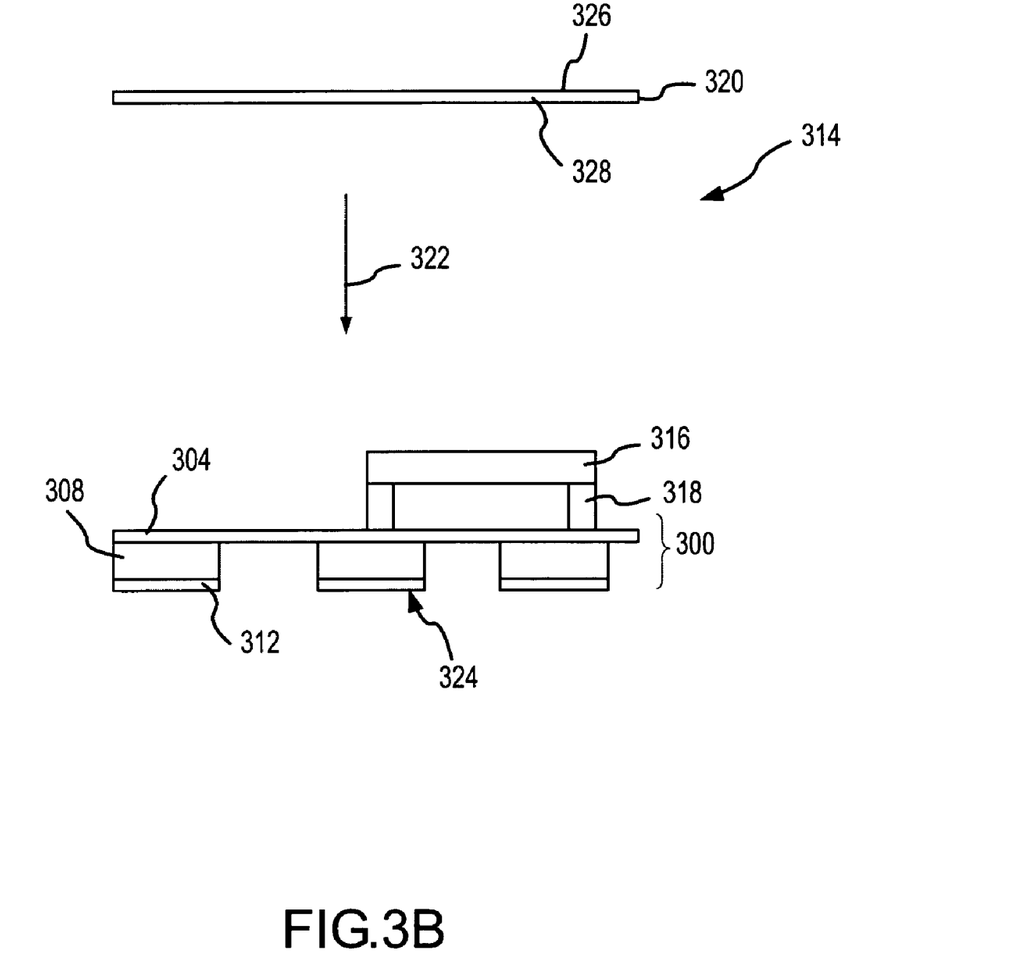
FIG. 3B is a side cross-sectional view of an integrated cell unit in accordance with the present invention incorporating the antenna assembly of FIG. 3A.

FIG. 3B shows the assembly-300 incorporated into an integrated cell unit 314. In particular, a battery assembly 316 is mounted on the antenna assembly 300 via thermal standoffs 318. The battery assembly may include a Lithium ion battery and a controller together with associated leads and circuitry. The battery assembly 316 is connected with the solar array 310 via leads (not shown). The standoffs 318 are used to mount the battery assembly 316 on the antenna assembly 300. These leads 318 in the illustrated embodiment are used to provide two additional thermal control mechanisms. First, the length of the leads 318 can be selected to locate the battery assembly 316 at a desired location on the thermal gradient axis, generally identified by arrow 322. It will be appreciated in this regard that thermal energy passes from the solar array 322 to the external surface 324 of the antenna assembly 300 thereby defining a temperature gradient. The location of the battery assembly 316 along this temperature gradient can be selected to assist in maintaining the battery assembly 316 at the desired temperature range. It is noted in this regard that heat generated due to incidence of solar radiation on the external surface of solar array 320 is radiated from the internal surface 328 of the array 320. The standoffs 318 also define the thermal interface between the battery assembly 316 and the antenna assembly 300. In this regard, the number of standoffs, the cross-sectional area of the standoffs and the thermal properties of the standoff materials as well as other relevant heat transfer parameters, can be selected to fine tune the thermal environment for the Lithium ion cell.

Figure 4A:
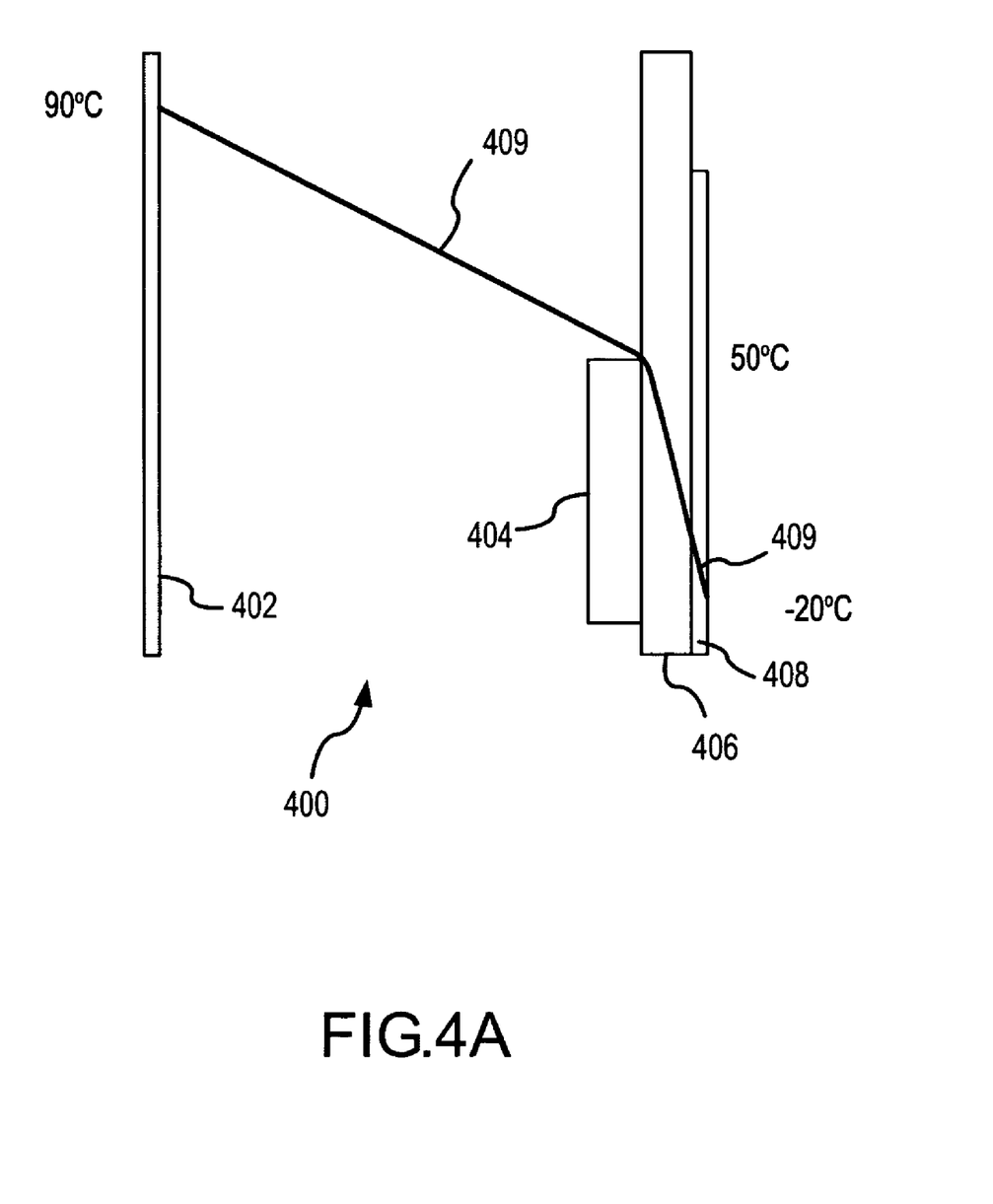
FIGS. 4A and 4B illustrate thermal gradients associated with different implementations of integrated cell units in accordance with the present invention.
Figure 4B:
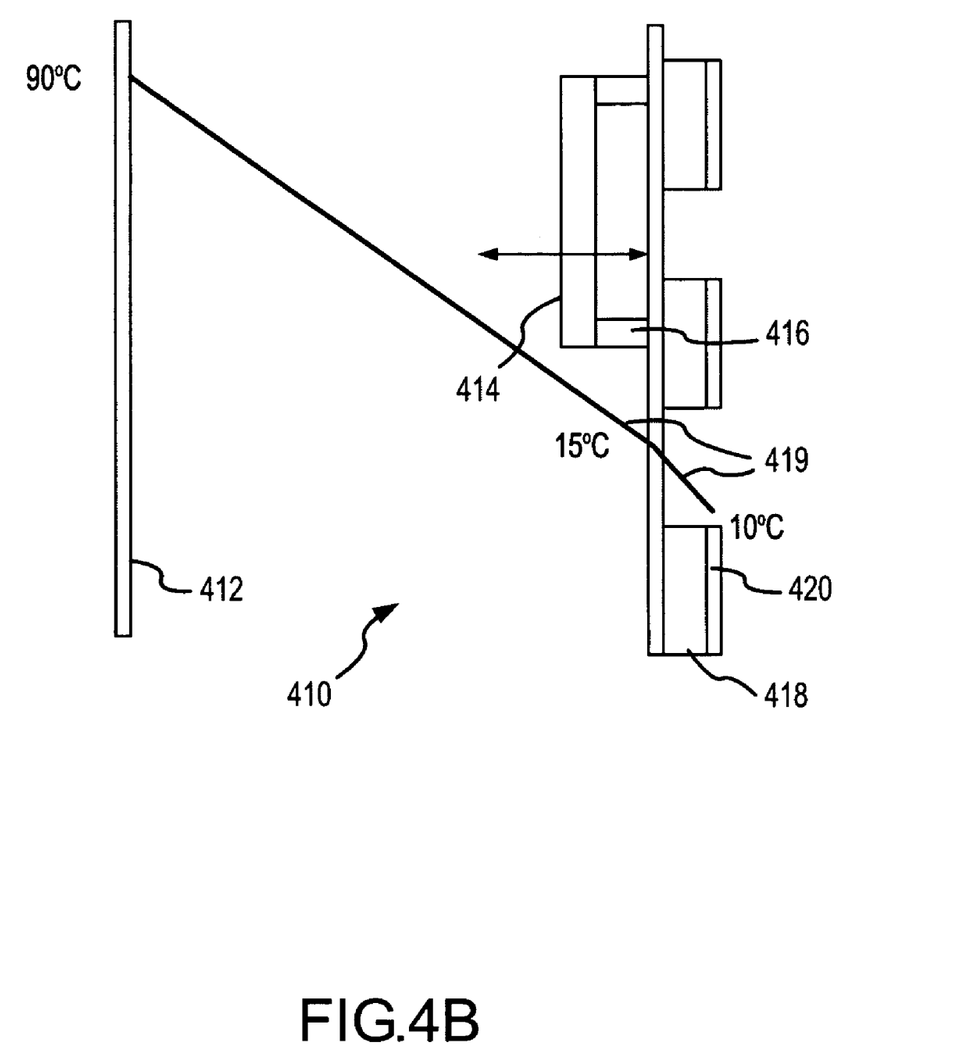

The use of these various controls to control the operating temperature range of the Lithium ion cell is illustrated by FIGS. 4A and 4B. Referring first to FIG. 4A, the illustrated integrated cell unit 400, generally corresponds to the structure of FIG. 2 above. In particular, the unit 400 includes a solar array 402, a Lithium ion cell 404, and an antenna assembly including a continuous dielectric spacer layer 406 and an antenna radiator layer 408. Lines 409 represent a spatial distribution of a temperature gradient (at least in the plane of the drawing). As shown, for particular operating conditions, the operating temperature drops only from 90° C. to 50° C. between the solar array 402 and the Lithium ion cell 404. The temperature then drops to −20° C. in the relatively short distance between the cell 404 and the radiator 408. These particular operating conditions would be less than ideal for a Lithium ion cell. This reflects the substantial insulating properties of the low dielectric spacer layer which reduces the unit's efficiency in discharging heat (although it will be appreciated that limited efficiency in heat discharge may be desireable for certain operating environments). As noted above, it is typically desireable to maintain these Lithium ion cells within a temperature range between 30° C. and −15° C.

FIG. 4B shows an alternate construction of an integrated cell unit 410 generally corresponding to that of FIG. 3 described above. In particular, the unit 410 includes solar array 412, a Lithium ion battery 414 mounted on thermal standoffs 416, a partial insulating layer defined by discrete spacers 418 and an antenna radiator 420. The illustrated unit 410 differs from that described in FIG. 4A, among other things, due to the use of the standoffs 416 and the spacers 418 which do not cover the entire thermal interface between the array 412 and the radiator layer 420. In this manner, better dissipation is provided across the antenna assembly. This reduces the maximum temperature experienced at the Lithium ion cell 414.

The spacers 416 can be used as described above to fine tune the thermal environment of the cell 414 so that the temperature operating extrema are within the desired parameters, e.g., between 30° C. and −15° C. The resulting temperature gradient is illustrated by lines 419. As shown, for particular operating conditions, the operating temperature drops from 90° C. at the array 412 to 15° C. at the inner surface of the antenna assembly and then to 10° C. at the radiator surface. It will be observed that this construction not only facilitates maintaining the cell 414 within a closely controlled temperature range but also facilitates controlling the temperature range of other components such as electronics associated with the antenna assembly.

In addition, it will be observed that the temperature gradient in the embodiment of FIG. 4B is steeper between the array 412 and the antenna assembly but not as steep across the antenna assembly as compared to the embodiment of FIG. 4A. This is a result of improved heat transfer across the antenna assembly and more efficient discharge of heat from the solar array 412 via the radiator surface 420. The increased steepness of the gradient between the array 412 and the antenna assembly allows for improved passive thermal control of the cell 414. The reduced steepness of the gradient 419 across the antenna assembly allows for improved passive thermal control of antenna electronics.

Figure 5A:
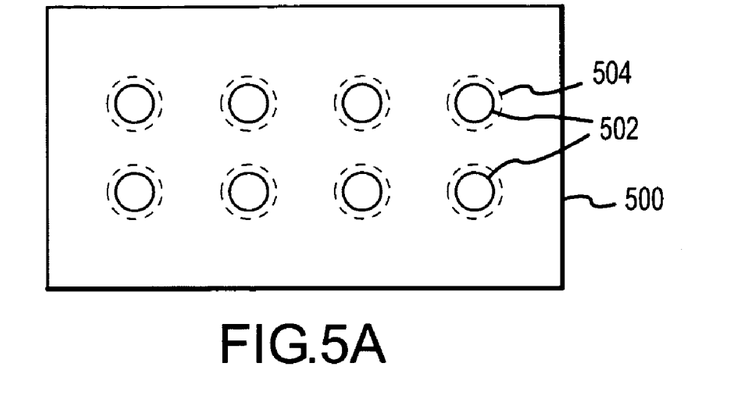
FIGS. 5A–5C illustrate various partial insulating layer configurations for the antenna assembly in accordance with the present invention.
Figure 5B:
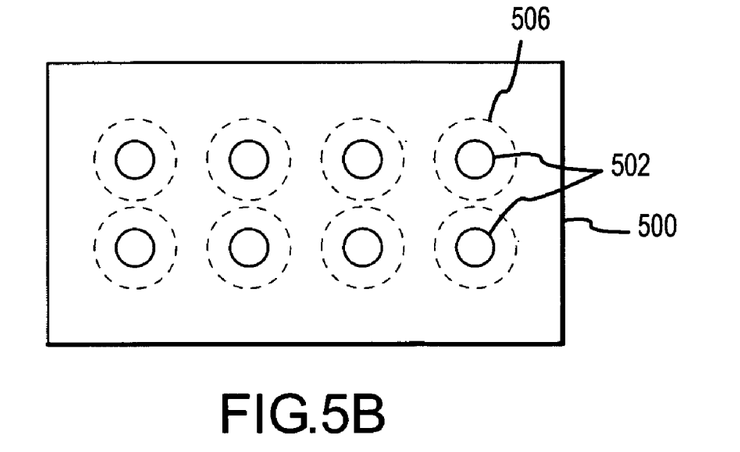
Figure 5C:
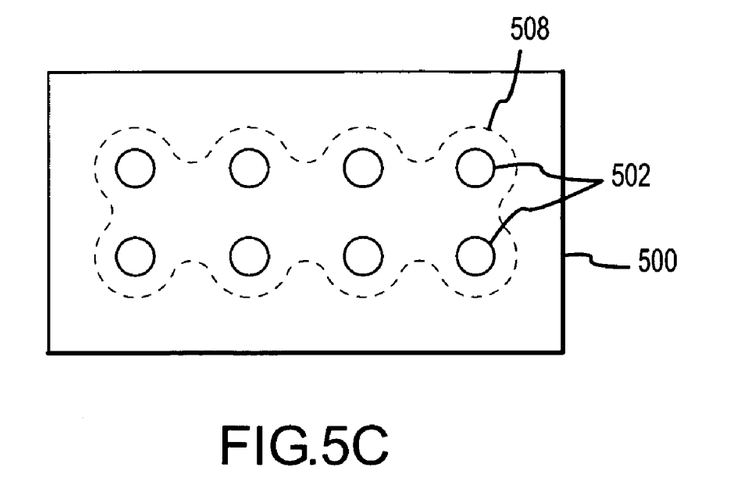

These improved gradient characteristics result in part from the design of the partial insulating layer 418 disposed between the antenna emitter elements. In this regard, the size and configuration of this layer 418 may be selected to tune the overall heat dissipation characteristics of the integrated cell unit based on mission requirements. This is illustrated by FIGS. 5A–5C. In each of these figures, the thermal interface between the array and the antenna radiator surface is identified by the area 500 and the footprint of the stack emitter elements is indicated by the area 502.

In FIG. 5A, the dielectric spacer layer is defined by discrete Rohacell foam pads 504 generally corresponding in size and shape to the emitters 502. In FIG. 5B, the Rohacell foam pads 506 are enlarged in relation to the emitters 502 to provide greater coverage of the interface 500. In FIG. 5C, the spacer layer is formed by a continuous Rohacell foam pad 508 extending across the interfaces between the emitter pairs but extending across less than the entirety of the interface 500. Thus, the coverage ratio of the layer 418 (the ratio of the area of the interface percentage) may vary, in typical stacked patch antenna implementations from about whatever is required to meet RF requirements to 100%. It will be appreciated in this regard that the configuration of 5A provides the greatest heat exchange across the interface 500 while the configuration of FIG. 5C provides for less heat dissipation. The dielectric layer may be designed in this regard to meet mission requirements so as to keep components of interest within the desired operating temperature range.

Figure 6:
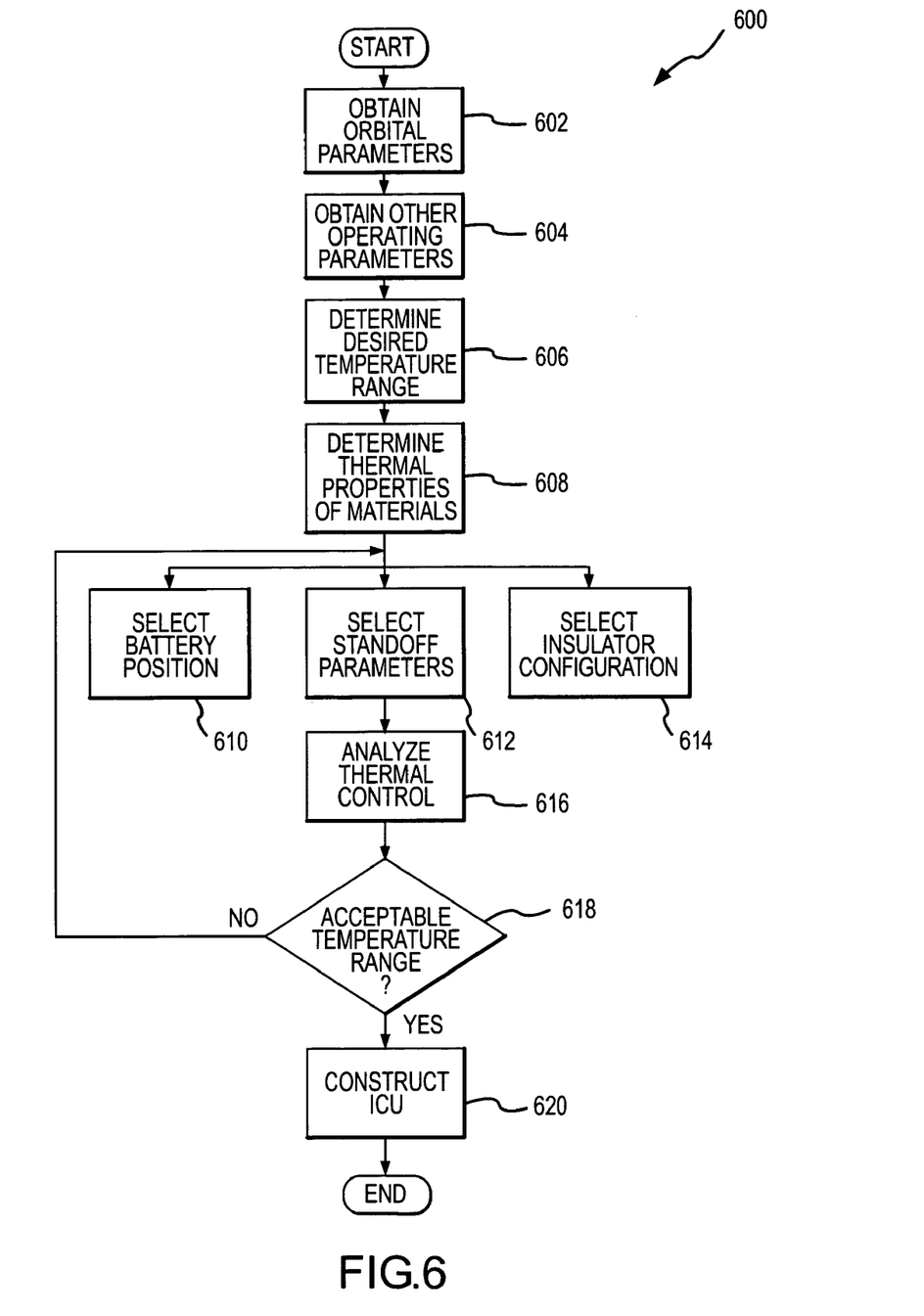
FIG. 6 is a flowchart illustrating a process for designing construction of an integrated cell unit in accordance with the present invention.

FIG. 6 is a flow chart illustrating a process for designing and constructing an integrated cell unit as described above. It will be appreciated that the sequence of certain steps of the process 600 may be varied from the illustrated sequence. The illustrated process is initiated by obtaining (602) orbital parameters for the mission under consideration. Such orbital parameters may include orbital betas, orbital shading associated with orbital phase and orbital altitude. It will be appreciated that these orbital parameters may impact the radiation intensity at both the antenna and solar array surface. Other operating parameters (604) may then be obtained. Such orbital parameters may relate to solar array incidence angles, instrumentation densities and instrument operating modes, among other things. The desired temperature range may then be determined (606) for the controlled components, such as Lithium ion batteries and antenna electronics. As noted above, it may be desired to maintain a Lithium ion battery within a temperature range of +30° C. to −15° C. Antenna electronics may be maintained within a temperature range of between +40° C. and −40° C. In addition, the thermal properties of the integrated cell unit materials may be determined (608). All of these values define a set of input conditions that may be used to define an appropriate passive thermal control system.

Based on these conditions, a designer may select (612) standoff parameters and select (614) an insulator configuration. The standoff parameters, as described above, include, for example, the number of thermal standoffs, the cross-sectional areas of thermal standoffs, the length of the thermal standoffs, the thermal properties of the standoffs, the configuration of the standoffs and any other factors affecting heat transfer between the battery and the antenna assembly. As described above, the insulator configuration may be varied with respect to coverage of a thermal interface between the solar array and the antenna radiator. This may involve the proportion of the interface covered and/or the specific dielectric layer materials and geometry. Once the controlled component standoff parameters and insulator configuration have been selected, the thermal control properties of the resulting system may be analyzed (616). For example, these properties may be analyzed using conventional software.

If the resulting operating temperature range of the control component is within the desired ranges, then the design may be finalized and construction (620) of the integrated cell unit may proceed. Otherwise, the designer may iteratively select new controlled component standoff parameters and insulator configurations until acceptable operating temperature ranges are achieved.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. An integrated antenna and solar array unit, comprising:
   a solar array assembly, having an array external surface for receiving solar radiation;
   an antenna assembly having an antenna external surface operative to radiate thermal energy therefrom, said antenna external surface facing substantially opposite said array external surface;
   said solar array assembly being in thermal communication with said antenna assembly so that thermal energy passes from said solar array assembly to said antenna external surface thereby defining a thermal gradient; and
   a battery unit, operatively associated with said solar array assembly and said antenna assembly, disposed in said thermal gradient between said solar array assembly and said antenna assembly.

2. A method as set forth in claim 1, further comprising structure for controlling heat transfer properties between said solar array assembly and said antenna external surface so as to maintain said battery unit within a desired temperature range.

3. A method as set forth in claim 2, wherein said structure comprises a partial insulating layer formed from heat insulating material interposed between said solar array assembly and said antenna external surface, said partial insulating layer extending across a first portion of a heat exchange interface area between said solar array assembly and said antenna external surface and being absent from a second portion of said heat exchange interface area so as to permit heat transfer across said portion via radiation.

4. An integrated antenna and solar array unit as set forth in claim 3, wherein said partial insulating layer is disposed between said battery unit and said antenna external surface.

5. An integrated antenna and solar array unit as set forth in claim 3, wherein said partial insulating layer comprises a continuous sheet of said heat insulating material extending across said first portion of said heat exchange area.

6. An integrated antenna and solar array unit as set forth in claim 1, wherein said antenna assembly comprises two radiating elements separated by said heat insulating material.

7. An integrated antenna and solar array unit as set forth in claim 2, wherein said structure comprises a thermal standoff for providing a spacing between said battery unit and interconnected structure of said integrated antenna and solar array unit.

8. An integrated antenna and solar array unit as set forth in claim 7, wherein said thermal standoff is disposed on a low energy side of said battery unit relative to said thermal gradient.

9. An integrated antenna and solar array unit as set forth in claim 1, further comprising a charge control system for controlling charging of the battery source to stay within desired charge levels.

10. An integrated antenna and solar array unit, comprising:
   a solar array assembly, having an array external surface for receiving solar radiation;
   an antenna assembly having an antenna external surface operative to radiate thermal energy therefrom, said antenna external surface facing substantially opposite said array external surface;
   said solar array assembly being in thermal communication with said antenna assembly so that thermal energy passes from said solar array assembly to said antenna external surface, thereby defining a thermal gradient; and
   a partial insulating layer formed from heat insulating material interposed between said array external surface and said antenna external surface, said partial insulating layer extending across a first portion of a heat exchange interface area between said array external surface and said antenna external surface and being absent from a second portion of said heat exchange interface area so as to permit heat dissipation across said second portion to said antenna external surface via radiation.

11. A unit as set forth in claim 10, wherein said thermal communication between said solar array assembly and said antenna assembly is primarily via radiation with minimum conduction.

12. An integrated antenna and solar array unit as set forth in claim 10, further comprising a controlled component having a desired operating temperature range, said controlled component disposed in said thermal gradient between said array external surface and said antenna external surface.

13. An integrated antenna and solar array unit as set forth in claim 12, wherein said controlled component comprises a battery unit.

14. An integrated antenna and solar array unit as set forth in claim 13, further comprising a thermal standoff for providing a spacing between said battery unit and interconnected structure of said integrated antenna and solar array unit.

15. A method for use in constructing an integrated antenna and solar array unit, said unit including a solar array assembly having an array external surface for receiving solar radiation, an antenna assembly having an antenna external surface operative to radiate thermal energy therefrom, said antenna external surface, said solar array assembly being in thermal communication with said antenna assembly so that thermal energy passes from said solar array assembly to said antenna external surface thereby defining a thermal gradient, and a battery unit disposed in said thermal gradient between said array external surface and said antenna external surface, said method comprising the steps of:
   determining operating parameters for said unit related to generation of heat associated with said solar array unit;
   determining a desired operating temperature range of said battery; and
   using said operating parameters and said desired operating temperature range to configure a thermal interface between said array external surface and said antenna external surface so as to provide desired heat dissipation from said solar array unit via said antenna external surface.

16. A method as set forth in claim 15, wherein said thermal communication between said solar assembly and said antenna assembly is primarily via radiation with minimum conduction.

17. A method as set forth in claim 15, wherein said step of using comprises disposing a partial insulating layer at said thermal interface, wherein said partial insulating layer extends across a first portion of said thermal interface and is absent from a second portion of said thermal interface source to permit heat dissipation across said second portion to said antenna external surface.

18. A method as set forth in claim 15, further comprising the step of disposing a thermal standoff between said battery and interconnected structure of said integrated antenna and solar array unit.

* * * * *